US008302474B2

(12) United States Patent
Himeki et al.

(10) Patent No.: US 8,302,474 B2
(45) Date of Patent: Nov. 6, 2012

(54) FUEL LEVEL SENDER PROTECTOR

(75) Inventors: Hiroaki Himeki, West Bloomfield, MI (US); Jon Sussman, Brighton, MI (US)

(73) Assignee: Nissan North America, Inc., Franklin, TN (US)

( * ) Notice: Subject to any disclaimer, the term of this patent is extended or adjusted under 35 U.S.C. 154(b) by 340 days.

(21) Appl. No.: 12/871,054

(22) Filed: Aug. 30, 2010

(65) Prior Publication Data
US 2012/0048012 A1 Mar. 1, 2012

(51) Int. Cl.
*G01F 23/32* (2006.01)
(52) U.S. Cl. .......................................... 73/317
(58) Field of Classification Search .................... 73/317, 73/313, 314, 305; 116/229; 340/625
See application file for complete search history.

(56) References Cited

U.S. PATENT DOCUMENTS

| 6,711,950 B1* | 3/2004 | Yamaura et al. ............ 73/317 |
| 2010/0132456 A1* | 6/2010 | Lee ............................. 73/313 |

FOREIGN PATENT DOCUMENTS

| WO | 2005022094 A1 | 3/2005 |
| WO | 2008142709 A1 | 11/2008 |

* cited by examiner

*Primary Examiner* — Peter J Macchiarolo
*Assistant Examiner* — Tamiko Bellamy
(74) *Attorney, Agent, or Firm* — Young, Basile, Hanlon & McFarlane, P.C.

(57) ABSTRACT

Disclosed herein are embodiments of a fuel tank assembly and fuel pump module for a vehicle. One embodiment disclosed herein comprises fuel pump module with a body portion having an outer surface and a fuel level sender located on the body portion. The fuel level sender comprises a float arm movable along a movement range between an empty position and a full position and a fuel level sender protector. The protector comprises a guard portion positioned at a predetermined distance from the float arm such that the float aim is positioned between the guard portion and the outer surface of the body portion and configured to maintain the predetermined distance.

19 Claims, 8 Drawing Sheets

FUEL LEVEL SENDER PROTECTOR

TECHNICAL FIELD

The present invention generally pertains to the prevention of interference of fuel level sender float arms with fuel tank internal features or other component parts.

BACKGROUND

Fuel pump modules are used to pump fuel to the fuel injectors of internal combustion engines from the fuel tank. These fuel pump modules typically include various sensors. One such sensor on the fuel pump module is a fuel level sender, often incorporating a float arm for monitoring the level of fuel in the tank connected to a sensor that relays the level of fuel to the fuel gauge on the instrument panel. The fuel level sender is usually located near the bottom of the fuel pump assembly.

Fuel tanks typically have embosses on the floor of the tank and an opening at the top of the tank for receiving, locating, and holding the fuel pump module within the fuel tank. These embosses on the fuel tank can interfere with the fuel level sender by obstructing the movement path of the float arm. One way the embosses can interfere is by preventing the float arm from reaching the lowest point of the float arm movement path, thus causing the fuel gauge to fail to indicate a near-empty or empty condition. Another way the embosses can interfere is by pinching the float arm between the emboss and the fuel pump module, thus causing the fuel gauge to indicate an always empty or otherwise erroneous condition.

SUMMARY

Embodiments of a fuel pump module having a fuel level sender protector are disclosed herein. In one such embodiment, the fuel pump module for a vehicle comprises a body portion having an outer surface and a fuel level sender located on the body portion. The fuel level sender comprises a float arm movable along a movement range between an empty position and a full position and a fuel level sender protector. The protector comprises a guard portion positioned at a predetermined distance from the float arm such that the float arm is positioned between the guard portion and the outer surface of the body portion and configured to maintain the predetermined distance.

Also disclosed herein are embodiments of a fuel tank assembly having a fuel level sender protector. In one such embodiment, the fuel tank assembly comprises a fuel tank having at least one emboss extending from a surface within the fuel tank and a fuel pump module located within the fuel tank and having a body portion with an outer surface. A fuel level sender is located on the body portion of the fuel pump module and includes a float arm movable along a movement range between an empty position and a full position. A fuel level sender protector having a guard portion is positioned at a predetermined distance from the float arm such that the float arm is positioned between the guard portion and the outer surface of the body portion, the guard portion located between the float arm and the emboss to prevent the emboss from obstructing the movement range of the float arm.

These and other embodiments of the invention are described in additional detail hereinafter.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
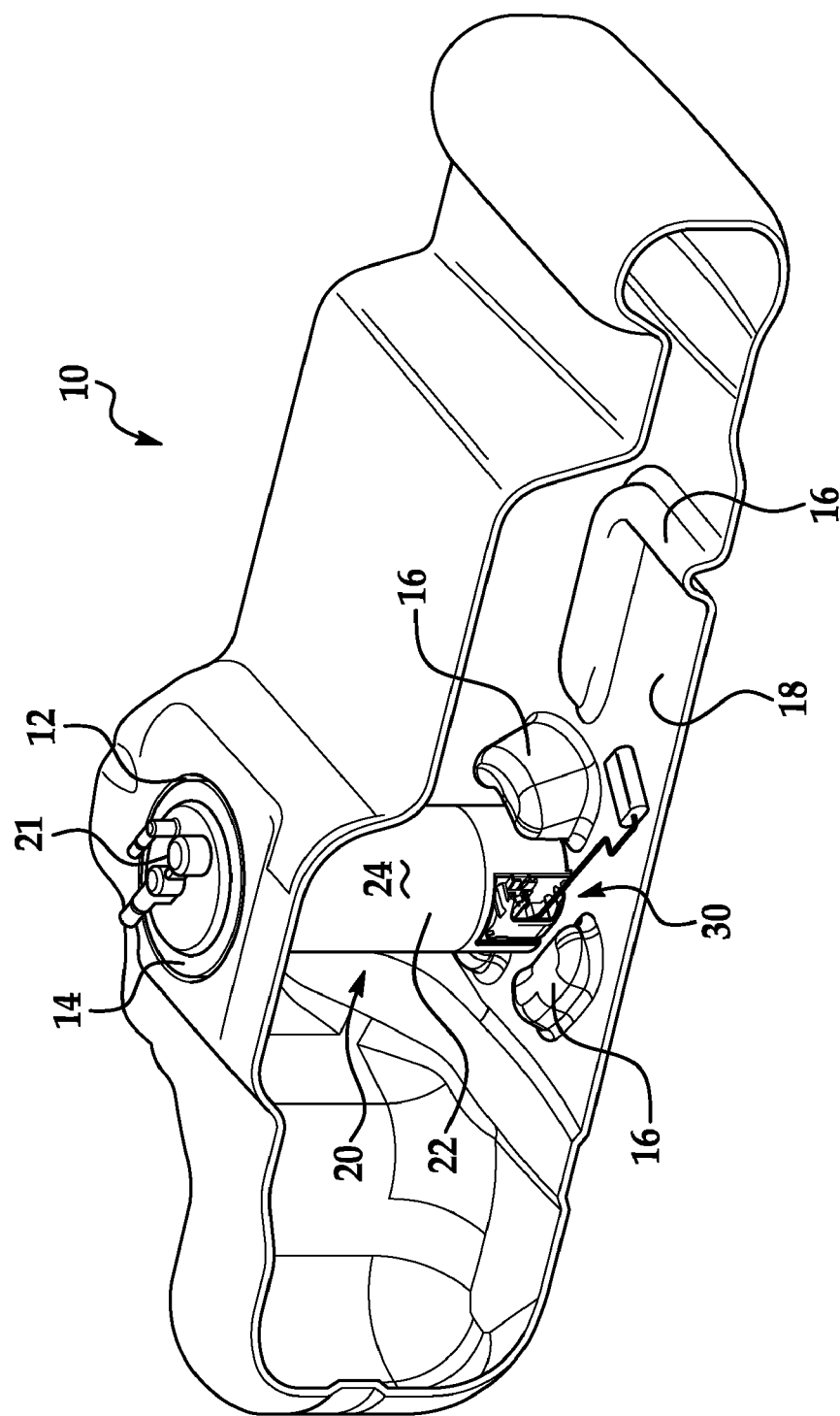
FIG. 1 is a side elevation view with partial cross-section of a fuel tank with a fuel pump module incorporating an embodiment of a fuel level sender protector disclosed herein.

FIG. 1 illustrates a perspective view of the inside of a fuel tank 10 for use in a vehicle to store fuel such as gasoline or diesel fuel. The fuel tank 10 has a fuel pump opening 12 with a seal 14 for receiving a fuel pump module 20. The fuel tank 10 also has one or more embosses 16 on the fuel tank floor 18 extending into the fuel tank 10 that cooperate with other vehicle components to best utilize the space within the vehicle while optimizing the fuel tank capacity. As shown in FIG. 1, three embosses 16 extend from the floor 18 of the fuel tank 10. However, these embosses 16 are illustrative and any number of embosses 16 may be formed in the fuel tank 10 on both the floor 18 and side walls of the fuel tank 10. The fuel tank 10 shown is also illustrative. Any fuel tank shape for use with a vehicle is contemplated in the scope of the embodiments.

Figure 2:
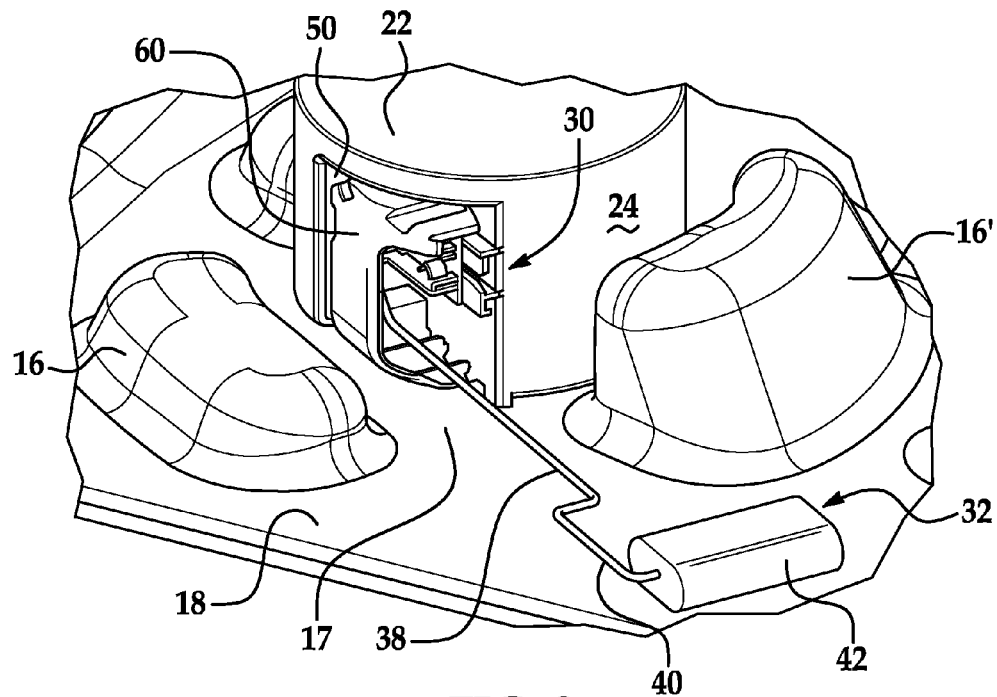
FIG. 2 is an enlarged side elevation view of the fuel pump module incorporating an embodiment of a fuel level sender protector disclosed herein installed in the fuel tank.
Figure 3:
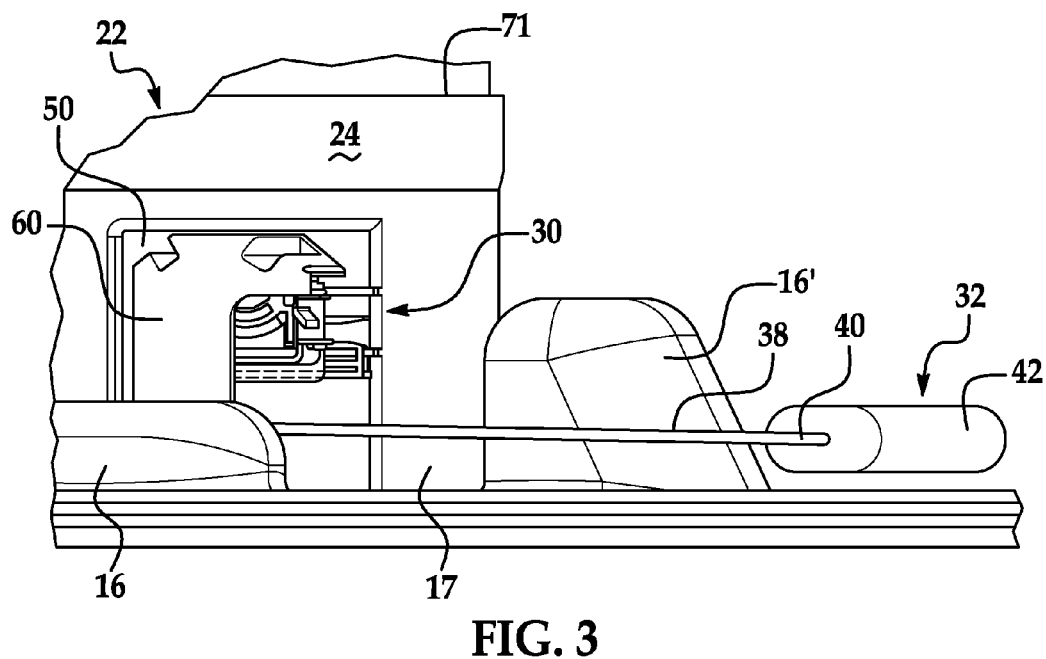
FIG. 3 is a side perspective view of a portion of the fuel pump module incorporating an embodiment of a fuel level sender protector disclosed herein.

The fuel pump module 20 is installed in the fuel tank 10 through the fuel pump opening 12, shown in FIG. 1 through the top surface of the fuel tank 10. The fuel pump module 20 has a cap 21 that secures the fuel pump module 20 in the opening 12 of the fuel tank 10. The fuel pump module 20 comprises a body portion 22 having an outer surface 24 and a fuel level sender 30 located on the body portion 22. The fuel level sender 30, as seen in FIGS. 2 and 3, comprises a float arm 32 and a fuel level sender protector 60. The float arm 32 can include a pivot portion 34 (shown in FIGS. 5 and 6) configured to move about a pivot 36 (shown in FIG. 6), an extending portion 38 extending from the pivot portion 34 and a float portion 40 supporting a float 42, the float portion 40 extending from the extending portion 38. The pivot portion 34 supports the wiper arm 35 of the fuel level sender 30. The configuration of the float arm 32 is provided for illustration and is not meant to be limiting. Other configurations are contemplated within the scope of the disclosure.

The floor 18 of the fuel tank 10 can have a first emboss 16 and a second emboss 16' as shown in FIG. 2 that define a passage 17 between them. The float arm 32 of the fuel level sender 30 can be configured to extend through this passage 17 when the fuel pump module 20 is installed in the fuel tank 10 and the float arm 32 is in the empty position P0. This configuration is not meant to be limiting. Other configurations between the float arm 32 and embosses 16, 16' are contemplated within the scope of the disclosure.

Figure 4:
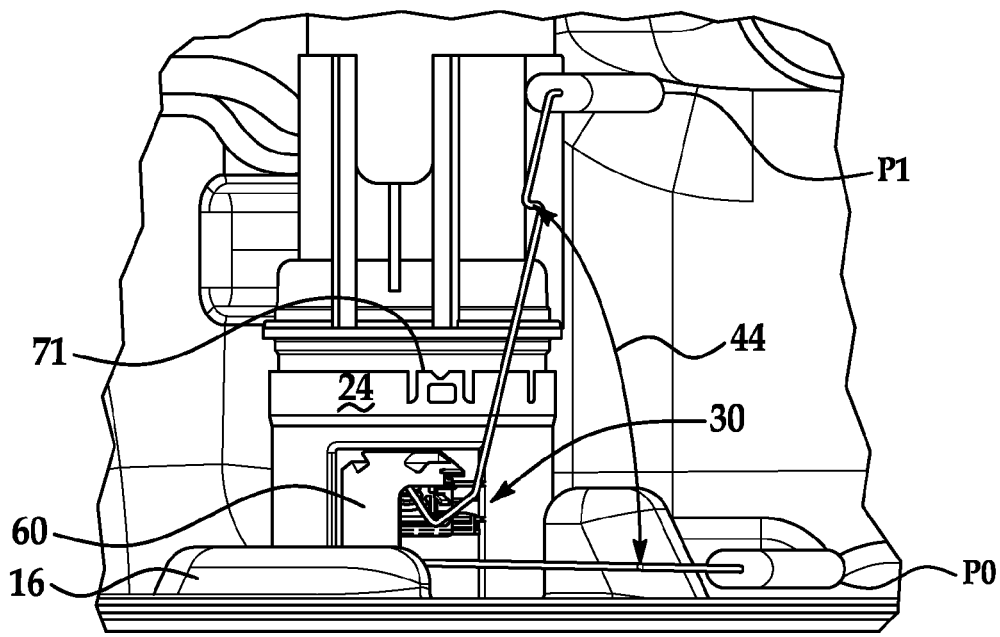
FIG. 4 is a side perspective view of a portion of the fuel pump module incorporating an embodiment of a fuel level sender protector disclosed herein and illustrating the movement range of the float aim.
Figure 5:
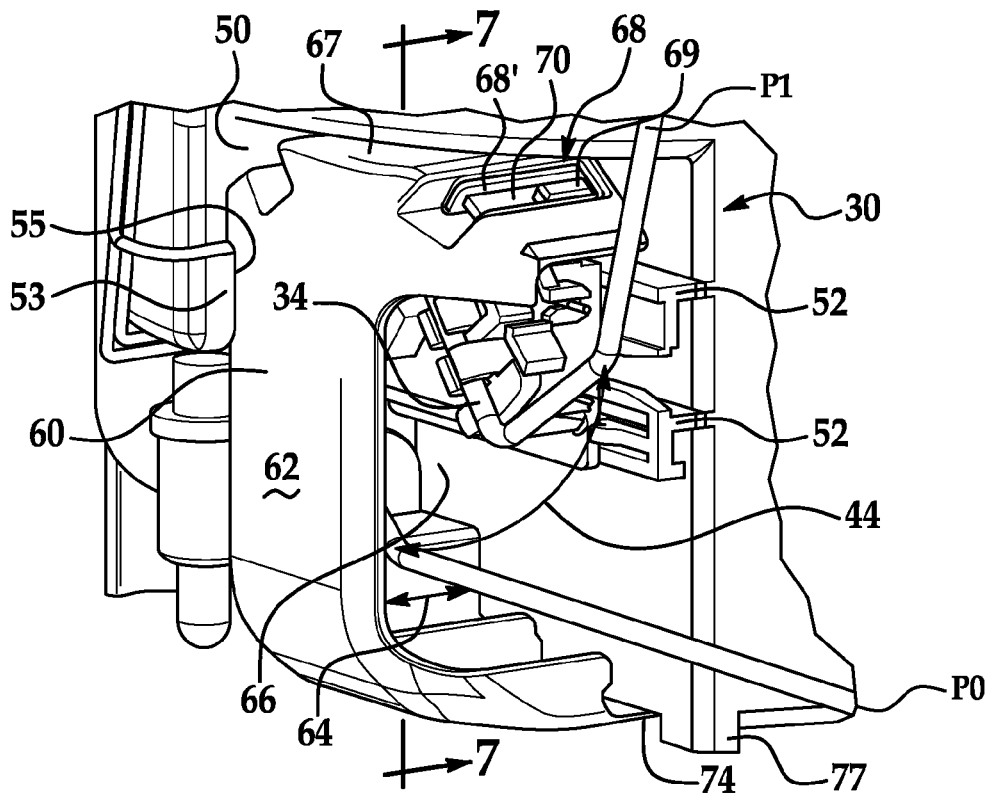
FIG. 5 is an enlarged perspective view of FIG. 4 illustrating the movement range of the float arm.

Referring to FIGS. 4 and 5, the float arm 32 is configured to be movable via the pivot 36 along a movement range 44 between an empty position P0 and a full position P1. The float arm 32 movement is affected by the fuel level in the fuel tank 10. The float arm 32 floats on the surface of the fuel and moves with the surface of the fuel.

Figure 6:
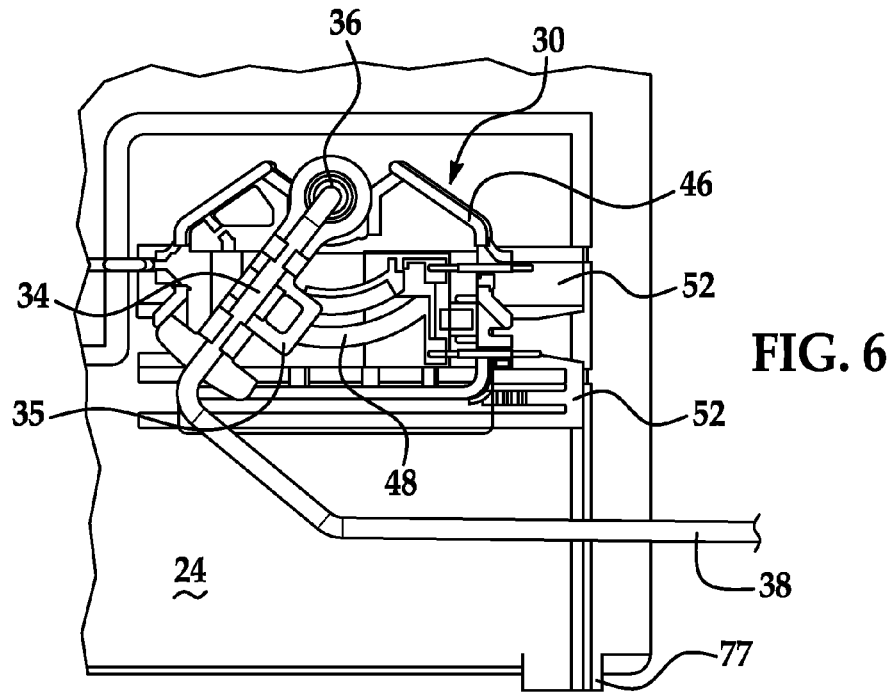
FIG. 6 is a front perspective view of the fuel pump module with the embodiment of a fuel level sender protector removed to illustrate the fuel level sender.

Referring to FIG. 6, the fuel level sender 30 can include a housing 46 for a sensor 48 such as a resistance card that senses the position of the float arm 32 within the movement range 44 via the wiper arm 35 and sends this information to a fuel gauge (not shown). As shown in FIG. 6, the housing 46 can include the pivot 36 around which the float arm 32 moves.

Because the fuel pump module 20 must fit through the fuel pump opening 12 and is inaccessible once through the opening 12 and in the fuel tank 10, the fuel pump module 20 can have a recess 50 in the body portion 22 to accommodate the fuel level sender 30 and fuel level sender protector 60. The recess 50 is best shown in FIGS. 2 and 3. The recess 50 can include installation tracks 52 extending from the body portion 22 outer surface 24. The fuel level sender housing 46 can be configured to cooperate with the installation tracks 52, the housing 46 engaging with the tracks 52 to position and maintain the fuel level sender 30 within the fuel pump module 20. The installation tracks 52 are best seen in FIGS. 5 and 6. The use of installation tracks is meant to be illustrative and not limiting. Other installation means are contemplated within the scope of the disclosure.

The housing 46 of the fuel lever sender 30 can alternatively be located internal the body portion 22 of the fuel pump module 20. The installation tracks 52 can be on an internal surface of the body portion 22 with the float arm 32 extending through an aperture in the outer surface 24 of the body portion 24.

Again referring to FIG. 5, the fuel pump module 20 can include a locating protrusion 53 that can cooperate with an installation locating guide 55 on the fuel level sender protector 60. The locating protrusion 53 can be an emboss on the fuel pump module 20 extending into the recess 50 as shown to provide a guide surface that engages the protector 60 when it is installed. The installation locating guide 55 on the protector 60 can be a recess on a portion of the fuel level sender protector 60 for locating the protector 60 as it is installed. The shapes and dimensions are provided by way of example and are not meant to be limiting. Other embodiments of locating protrusions and installation locating guides are contemplated within the scope of this disclosure.

Figure 7:
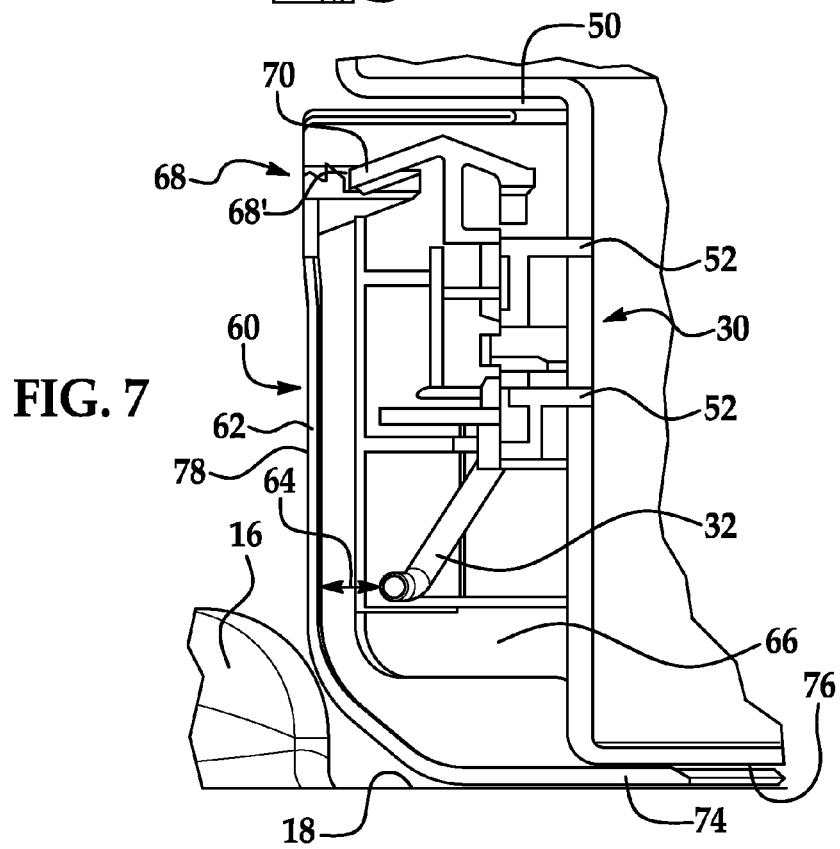
FIG. 7 is a cross-sectional view of FIG. 5 along line 7-7.
Figure 8:
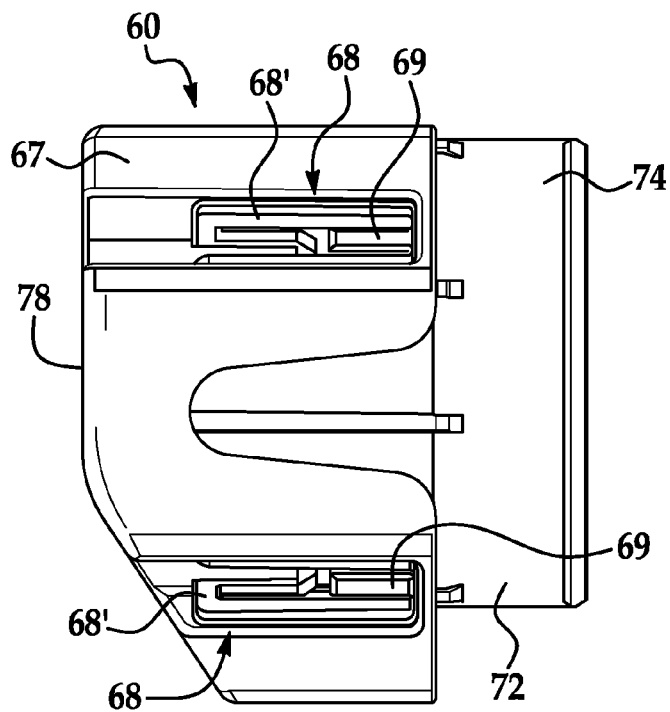
FIG. 8 is a top elevation view of an embodiment of the fuel level sender protector disclosed herein.
Figure 9:
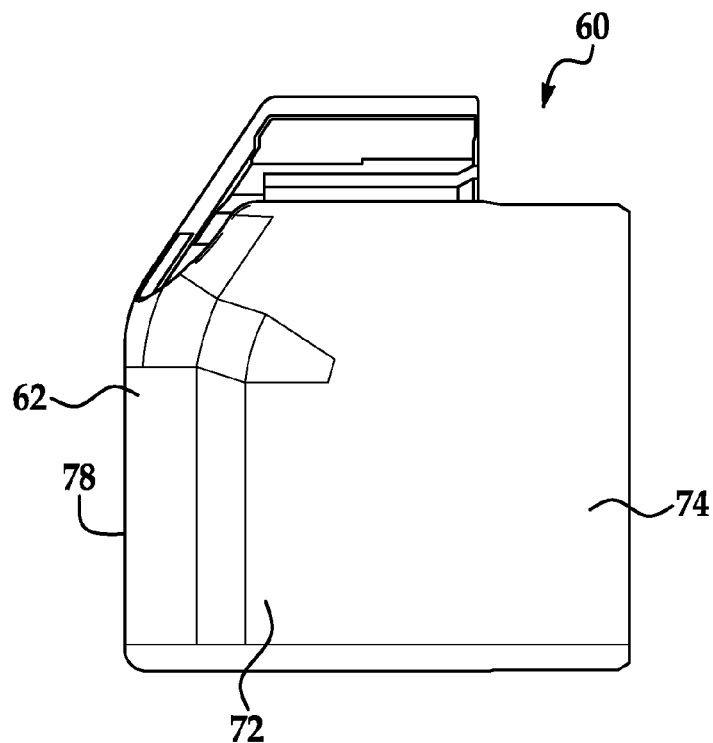
FIG. 9 is a bottom elevation view of the embodiment of the fuel level sender protector of FIG. 8.

The fuel level sender protector 60 can comprise a guard portion 62 positioned at a predetermined distance 64 from the float arm 32 such that the float arm 32 is positioned between the guard portion 62 and the outer surface 24 of the body portion 22. This is best illustrated in FIGS. 5 and 7. The fuel level sender protector 60 creates a cavity 66 within which the float arm 32 can freely move along the movement range 44 without obstruction from one or more of the embosses 16 or other fuel tank 10 components. The guard portion 62 can conceal the pivot portion 34 of the float arm 32 within the cavity 66 when the float arm 32 is in the empty position P0.

The fuel tanks and embosses can be made of a plastic such as a high-density polyethylene (HDPE). There are many advantages to using plastic fuel tanks, including but not limited to reduction in weight, reduction or elimination of seams, and reduction or elimination of corrosion. However, plastic fuel tanks are permeable and can warp when permeated or semi-permeated with fuel. It is this warping of the embosses and/or other components that can obstruct the float arm 32 of the fuel level sender 30, causing erroneous readings. A warped emboss 16 is shown in contact with the fuel level sender protector 60 in FIG. 7. By providing the guard portion 62 of the fuel level sender protector 60 between the emboss 16 and the aim float 32, the guard portion 62 maintains the predetermined distance 64 between the emboss 16 and the float arm 32 and thus keeps the movement range 44 of the float arm 32 free from obstruction so that it is free to travel along the entire movement range 44.

Referring to FIGS. 7-12, the fuel level sender protector 60 can engage the housing 46 of the fuel level sender 30 to position the protector 60 and maintain the protector's position. Because of the fuel atmosphere (as used herein, an atmosphere submerged in fuel, partially submerged in fuel, or previously submerged in fuel), plastic material is also used for the fuel pump module 20 and the fuel level sender 20 and protector 60. Accordingly, engagement between these components is typically achieved without additional fasteners. For example, the fuel level sender protector can have an engagement portion at a top portion 67 opposite the fuel tank floor 18. The engagement portion can include a housing receiving portion 68 configured to receive a portion 70 of the housing 46, as seen in FIGS. 5 and 7. The housing receiving portion 68 can include at least one slot 68' and at least one clip 69 which engages the portion 70 of the housing 46 with a snap-fit connection. This engagement is provided by way of example and is not meant to be limiting. Other engaging means are contemplated within the scope of the disclosure.

It is also contemplated that the fuel level sender protector 60 can engage the body portion 22 of the fuel pump module 20, likely in a location proximate the housing 46 and/or recess 50. The protector 60 can have an engagement portion at its top portion 67 engaged with the outer surface 24 of the body portion 22. For example, the housing receiving portion 68 of the protector 60 may be a body receiving portion and can engage an edge 71 (shown in FIG. 4) of the body portion 22 with the body receiving portion as described.

The fuel level sender protector 60 can comprise a bottom portion 72 extending from a lower end of the guard portion and in contact with the body portion 22 of the fuel pump module 20. The bottom portion 72 can have an anti-warp flange 74 extending from a lower edge of the guard portion 62 or the bottom portion 72 and in contact with the body portion 22. The anti-warp flange 74 is configured to prevent both vertical warping and lateral warping of the guard portion 62 while the fuel pump module 20 is in the fuel atmosphere. The anti-warp flange 74 can be positioned, for example, in contact with a bottom surface 76 (shown in FIG. 7) of the body portion 22 and between the bottom surface 76 and the fuel tank floor 18. The bottom surface 76 of the body portion 22 can have any number of support legs 77 (shown in FIGS. 5 and 6) to provide clearance for the anti-warp flange 74 between the bottom surface 76 and the floor 18 of the fuel tank 10.

Figure 10:
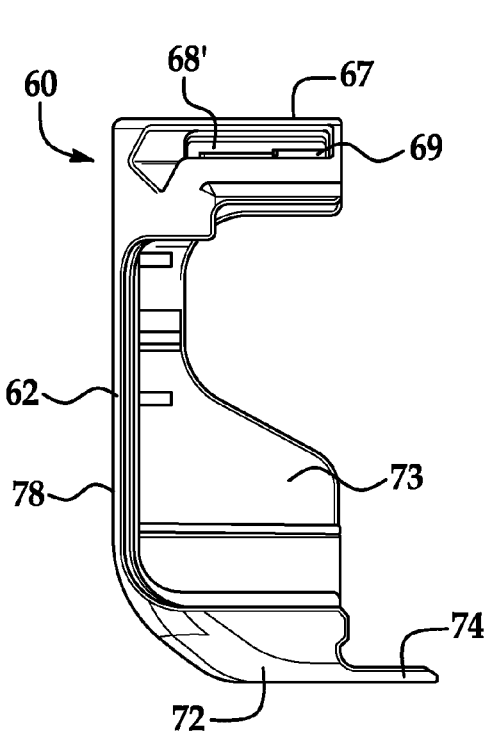
FIG. 10 is a side perspective view of the embodiment of the fuel level sender protector of FIG. 8.
Figure 11:
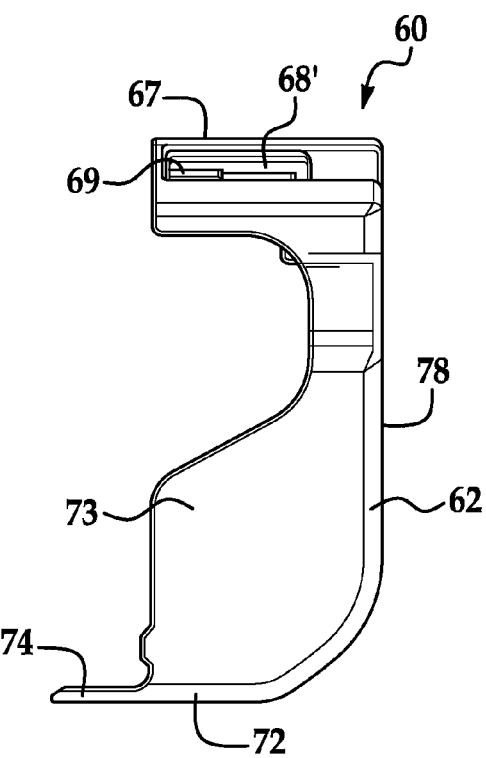
FIG. 11 is a side perspective view of the embodiment of the fuel level sender protector of FIG. 8.

The top portion 67, bottom portion 72 and guard portion 62 of the fuel level sender protector 60 together can have a substantially "C" shaped profile, seen best in FIGS. 10 and 11. This profile assists in preventing warping of the guard portion 62 in the fuel atmosphere to maintain the predetermined distance 64 or clearance for the float arm 32. It is also contemplated that the fuel level sender protector 60 can have a side portion 73 having a surface extending between the top portion 67 and bottom portion 72 to form another side defining the cavity 66. Thus, the pivot portion 34 of the float arm 32 can be surrounded on five sides, with the top side covered by the top portion 67 of the fuel level sender protector 60, the bottom side covered by the bottom portion 72 of the fuel level sender protector 60, the front side covered by the guide portion 62 of the fuel level sender protector 60, the rear side covered by the fuel level sender 30 and the fuel pump module 20, and one lateral side covered by the side portion 73 of the fuel level sender protector 60.

Figure 12:
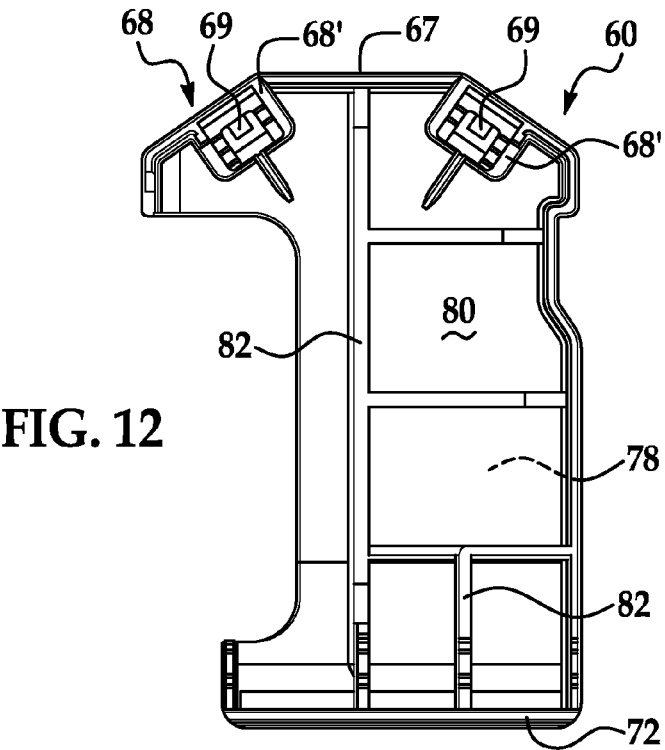
FIG. 12 is a rear perspective view of the embodiment of the fuel level sender protector of FIG. 8.

The guard portion 62 of the fuel level sender protector 60 is configured to be substantially flush with the outer surface 24 of the body portion 22 of the fuel pump module 20 that surrounds the recess 50, as shown in FIGS. 2, 5 and 7. The guard portion 62 is configured to guide the fuel pump module 20 into an installed position within the fuel tank 10, and a surface substantially flush with the outer surface 24 of the fuel pump module 20 can provide such guidance. The guard portion 62 can include a continuous guard surface 78 along its length and width. Referring to FIG. 12, the guard portion 62 can have an inward facing surface 80 opposite the guard surface 78 on which one or more reinforcement ribs 82 can be located. The reinforcement rib 82 or ribs can be located vertically along the inward facing surface 80, laterally along the inward facing surface 80, on an angle, or a combination thereof. The predetermined distance 64 is maintained between the reinforcement rib or ribs 82 and the float arm 32.

Figure 13A:
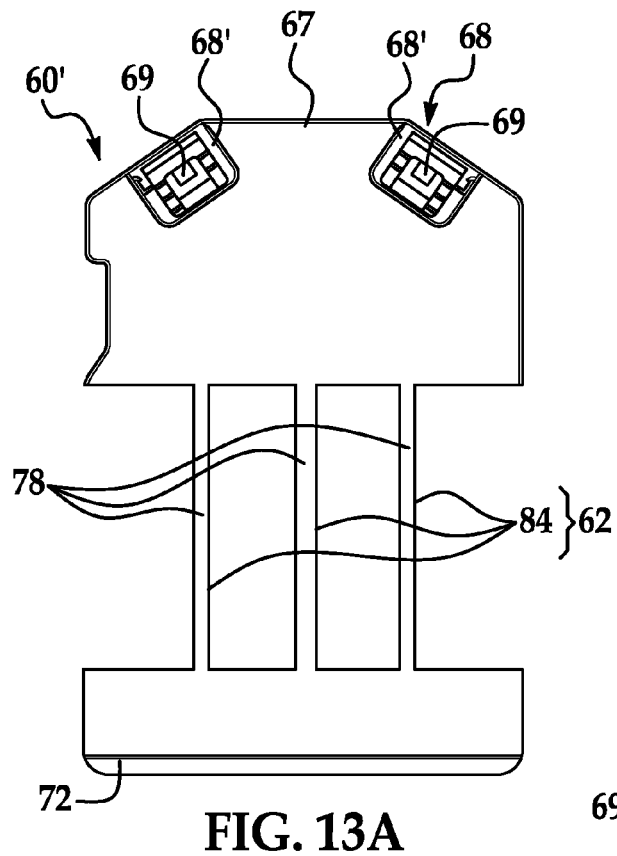
FIG. 13A is a front view of a second embodiment of a fuel level sender protector.
Figure 13B:
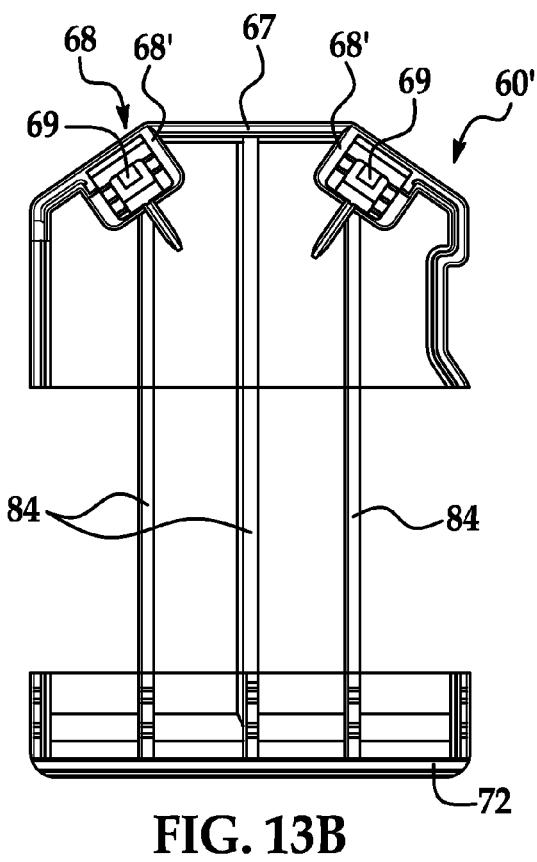
FIG. 13B is a rear view of a second embodiment of a fuel level sender protector.
Figure 14A:
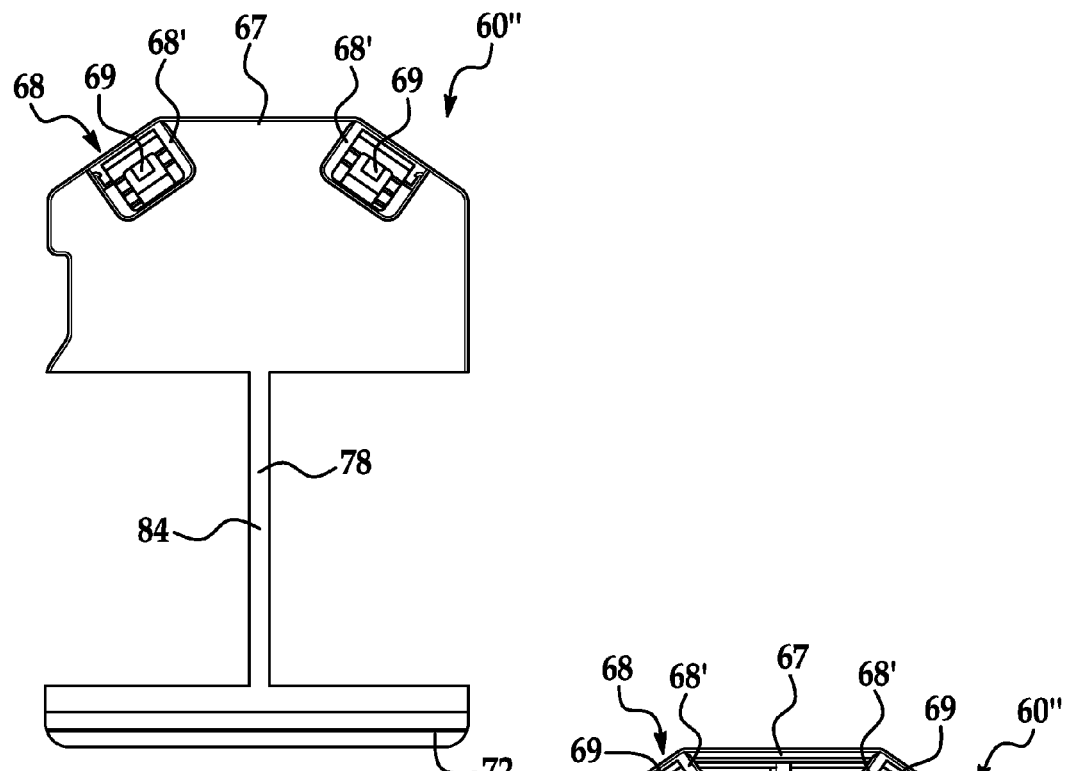
FIG. 14A is a front view of a second embodiment of a fuel level sender protector.
Figure 14B:
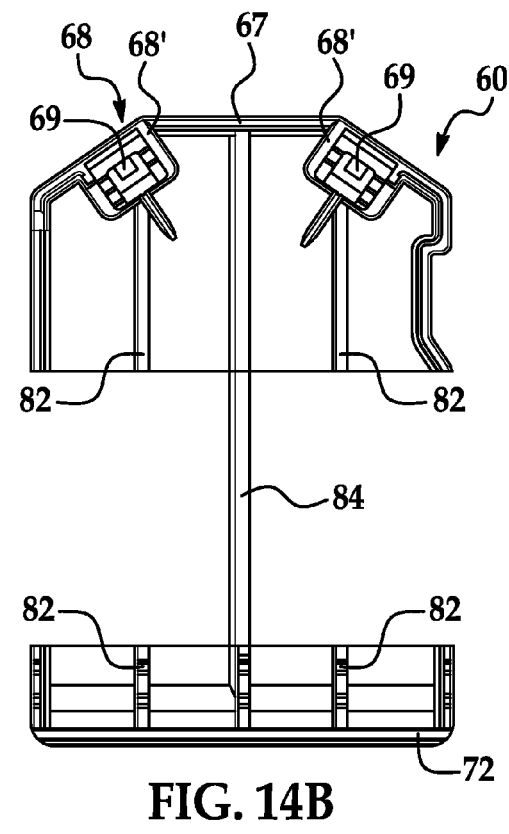
FIG. 14B is a rear view of a second embodiment of a fuel level sender protector

Another embodiment of the fuel level sender protector 60' is shown in FIGS. 13A and 13B. Alternative to a continuous guard surface, the guard portion 62 can comprise one or more ribs 84 extending between the top portion 67 and the bottom portion 72 of the protector 60. FIG. 13 illustrates a guard portion 62 having three ribs 84 extending between the top portion 67 and the bottom portion 72. Each of the three ribs 84 has a guard surface 78 facing away from the float arm 32. The predetermined distance 64 is maintained between the guard surfaces 78 of each rib 84 and the float arm 32. The three ribs 84 are used by way of example and are not meant to be limiting. The number of ribs 84 can be different, as well as the width of each rib 84. For example, in FIGS. 14A and 14B, a fuel level sender protector 60" is shown having a single rib 84 extending between the top portion 76 and the bottom portion 72. FIG. 14A is a view of the protector 60" from the front while FIG. 14B shows the protector 60" from the rear. Reinforcement ribs 82 can be incorporated into the protector 60" on the top portion 67 and/or bottom portion 72. The wider the guide surface 78, the more resistance the guard portion 62 will have to warping. Likewise, the greater the number of ribs 84 forming the protector 60, the greater the resistance to warping will be.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A fuel pump module for a vehicle fuel tank comprising:
   a body portion having an outer surface;
   a fuel level sender located on the body portion comprising:
   a float arm movable along a movement range between an empty position and a full position; and
   a fuel level sender protector comprising a guard portion positioned at a predetermined distance from the float arm such that the float arm is positioned between the guard portion and the outer surface of the body portion and configured to maintain the predetermined distance; and wherein the guard portion is one or more ribs, each having a continuous guard surface along its length and width.

2. The fuel pump module of claim 1, wherein the fuel level sender further comprises a housing attached to the outer surface of the body portion, wherein the fuel level sender protector has a housing receiving portion configured to receive a portion of the housing.

3. The fuel pump module of claim 2, wherein the housing receiving portion includes at least one clip which engages the housing with a snap-fit connection.

4. The fuel pump module of claim 2, wherein the fuel level sender protector further comprises an anti-warp flange extending from a lower edge of the guard portion and in contact with the body portion, the anti-warp flange configured to prevent both vertical warping and lateral warping of the guard portion while the fuel pump module is in a fuel atmosphere.

5. The fuel pump module of claim 1, wherein the float arm includes a pivot portion configured to move about a pivot and an extending portion extending from the pivot portion, and wherein the guard portion conceals the pivot portion when the float arm is in the empty position.

6. The fuel pump module of claim 1, wherein the outer surface of the body portion includes a recess configured to receive the fuel level sender, and wherein the guard portion is substantially flush with the outer surface that surrounds the recess to create a cavity in which the float arm can freely pivot.

7. The fuel pump module of claim 1, wherein the guard portion includes a continuous guard surface along its length and width facing away from the fuel pump module.

8. The fuel pump module of claim 7, wherein the fuel level sender protector includes an inward facing surface opposite the guard surface and at least one reinforcement rib on the inward facing surface.

9. The fuel pump module of claim 1, wherein the fuel level sender protector has an engagement portion at a top portion of the guard portion engaged with the outer surface of the body portion, and a bottom portion extending from a lower end of the guard portion in direct contact with the body portion.

10. A fuel tank assembly comprising:
    a fuel tank having at least one emboss extending from a surface within the fuel tank;
    a fuel pump module located within the fuel tank and having a body portion with an outer surface;
    a fuel level sender located on the body portion of the fuel pump module, the fuel level sender including a float arm movable along a movement range between an empty position and a full position; and
    a fuel level sender protector having a guard portion positioned at a predetermined distance from the float arm such that the float arm is positioned between the guard portion and the outer surface of the body portion, the guard portion located between the float arm and the emboss to prevent the emboss from obstructing the movement range of the float arm.

11. The fuel tank assembly of claim 10, wherein the emboss is formed on and extends from a floor of the fuel tank.

12. The fuel tank assembly of claim 10, wherein the guard portion is configured to contact the emboss in a fuel atmosphere to maintain the predetermined distance between the float arm and the emboss.

13. The fuel tank assembly of claim 10, wherein the at least one emboss is a first emboss and a second emboss, wherein a passage is defined between the first emboss and the second emboss through which the float arm extends when in the empty position.

14. The fuel tank assembly of claim 10, wherein the guard portion is configured to guide the fuel pump module into an installed position within the fuel tank.

15. The fuel tank assembly of claim 10, wherein the fuel level sender protector further has a top portion and a bottom portion between which the guard portion extends, the top portion attached to at least one of the fuel level sender and the body portion of the fuel pump module, and the bottom portion received between a floor of the fuel tank and a bottom surface of the body portion of the fuel pump module.

16. The fuel tank assembly of claim 15, wherein the fuel level sender further comprises a housing attached to the outer surface of the body portion, and wherein the top portion has a housing receiving portion configured to receive a portion of the housing.

17. The fuel tank assembly of claim 16, wherein the housing receiving portion includes at least one clip which engages the housing with a snap-fit connection.

18. The fuel tank assembly of claim 10, wherein the fuel level sender protector further comprises an anti-warp flange extending from a lower edge of the guard portion and in contact with the body portion, the anti-warp flange configured to prevent both vertical warping and lateral warping of the guard portion in a fuel atmosphere.

19. The fuel tank assembly of claim 10, wherein the outer surface of the body portion includes a recess configured to receive the fuel level sender, and wherein the guard portion is substantially flush with the outer surface that surrounds the recess to create a cavity in which the float arm can freely pivot.

* * * * *